9330½X
C. Buckland,
Cutting Corset Rings,
Patented Jan. 20, 1836.
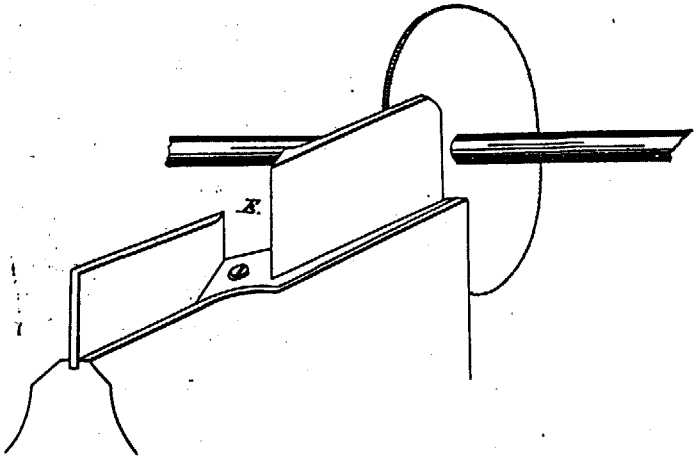
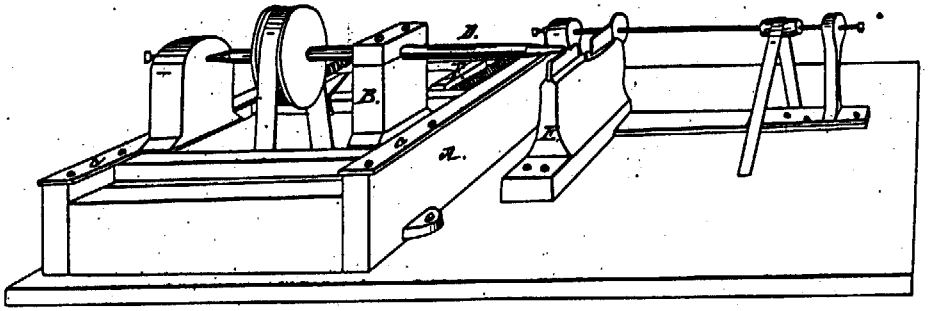
AM. PHOTO-LITHO. CO. N.Y. (OSBORNE'S PROCESS)

Charles Buckland 1

Letters Patent 9330½X

No 25.

The Schedule referred to in these Letters Patent
and making part of the same containing a description
of in the words of the said Charles Buckland
himself of his improvement in the machinery for
cutting Grooves in Corset-rings and other Articles To all to whom these presents shall come
Be it known that I Charles Buckland of
Middletown in the county of Middlesex and State
of Connecticut have invented a new and useful im-
provement in Machinery for cutting grooves in
Corset-rings of bone ivory or other substance and
grooving rings wheels and round blocks of any other
material or description and that the following is a full
and exact description of the construction and operation
of the said Machine as invented or improved by me.

A frame of cast iron called the bed (Marked A in the
annexed drawing) twelve inches long and eight and
a half inches wide is fastened to a bench with screws.
Inside of this frame and on its rails is fitted another
frame of cast iron (Marked B) seven and a half
inches long and five and a half inches wide and so
adjusted as to slide on the rails at pleasure —
This inner frame is confined down to the rails by means
of two iron plates (Marked C.C.) with screws called
the slide-rest. On the side of the slide-rest opposite
to the front part of the frame are fitted two small
rods of iron and on these rods two spiral springs
so that as the operator pushes the slide rest from him
these springs by their equable contraction enable him
to move the slide rest steadily up to the saw or cutter Cr- On the top of the slide rest is fitted a revolving shaft
(Marked D) on the end, where the cruet ring is placed
to be cut; and as the operator pushes the slide rest to-
wards the saw the end of the shaft runs against a
double incline which crowding the ring upon the
ends of the shaft holds it while saw cuts the groove.
This being done the slide rest is withdrawn and in
returning the other end of the incline comes in contact
with the inside of the ring and crowds it off, leaving
the shaft ready to receive another ring when it is push
ed forward to the centre of the incline. The incline is
directly under the end of the shaft and is Marked
Ee in the drawing. On the inside of the box and
on the centre of the back rail there is fitted a small
block of wood (marked F) and is used as a guage
or stopper. If the slide rest is moved up to the
stopper the groove in the ring will be cut sufficiently
deep and the groove in all the rings will be precise
ly alike. On the side of the saw or cutter and just
below its teeth there is a small projection which comes
in contact with the sharp edges of the ring and gives
them a rounding sort of finish. Instead of a
saw or cutter a chisel may be substituted.
The preceeding description exhibits the machine
with its various proportions as I at present use it.
But it may be made of any other convenient di-
mensions; and although I use the Machine for cutting
the grooves in cruet rings of bone and ivory merely
yet it may be applied and I claim the privilege
of applying it to the cutting of grooves in rings wheels
or round blocks of any size or material. The
machine with suitable gearing may be operated by
water or any other adequate power. I do not claim
any any of the parts of the said Machine taken separately as my invention, but I do claim as my invention and improvement the combination of the several parts of the said Machine in the manner above specified to produce and thereby producing the effect of cutting with rapidity neatness and uniformity grooves in Collet rings of bone ivory or other substance and grooves in rings wheels and round blocks of any other material or description. Dated at Middletown the tenth day of August A.D. 1835.

Witness
Horace Clark
[illegible] Barnes

Charles Buckland

760 [illegible]

[illegible]

[illegible]